United States Patent

[11] 3,611,832

| [72] | Inventor | George W. Vollmer<br>Chardon, Ohio |
|---|---|---|
| [21] | Appl. No. | 44,126 |
| [22] | Filed | June 8, 1970 |
| [45] | Patented | Oct. 12, 1971 |
| [73] | Assignee | Eaton Yale & Towne Inc.<br>Cleveland, Ohio |

[54] GEARED DRIVE MECHANISM
13 Claims, 4 Drawing Figs.

[52] U.S. Cl.................................................. 74/700,
74/745, 74/363
[51] Int. Cl....................................................F16h 37/08,
F16h 3/02
[50] Field of Search.......................................... 74/700,
745, 363; 180/24.09

[56] References Cited
UNITED STATES PATENTS

| 1,999,612 | 4/1935 | Larsen et al. .................. | 74/745 |
| 2,791,130 | 5/1957 | Boughner...................... | 74/700 X |
| 2,858,713 | 11/1958 | Brownyer...................... | 74/700 |
| 2,858,714 | 11/1958 | Black ............................ | 74/700 X |
| 3,498,424 | 3/1970 | Beneke et al. ................. | 74/369 X |

*Primary Examiner*—Arthur I. McKeon
*Attorney*—Teagno & Toddy

ABSTRACT: An axle-mounted auxiliary transmission in which the output gear, clutch output member, and output shaft are in the form of a fabricated subassembly which can be easily disassembled without removing it from the transmission housing.

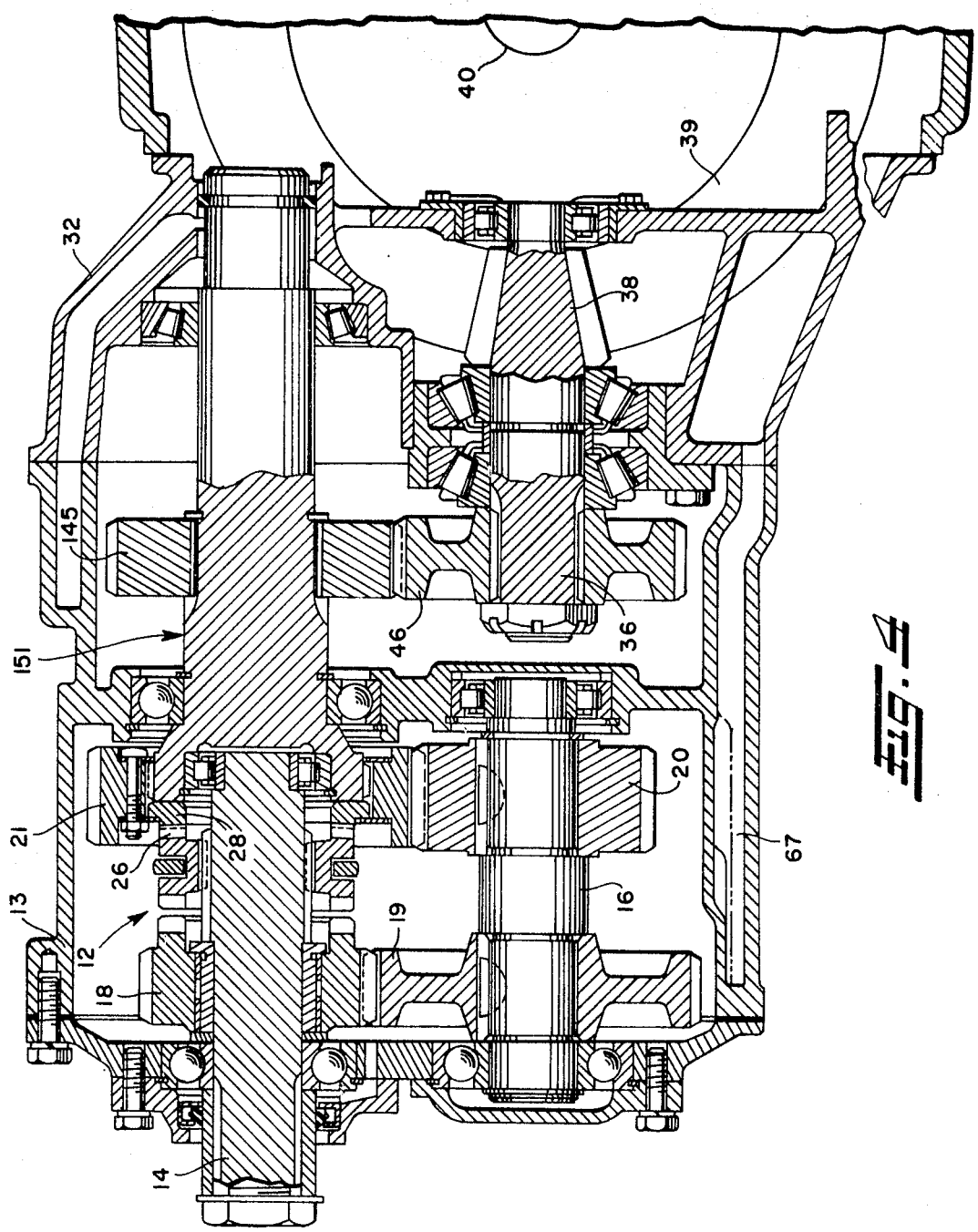

GEARED DRIVE MECHANISM

The present invention relates to a geared drive system and, in particular, to an improved auxiliary transmission for a drive axle, in which means are provided to facilitate disassembly of the major components thereof.

Tandem drive axles for use in heavy-duty trucks employ a power divider or interaxle differential unit, generally located ahead of the front drive axle, which provides a differential relationship between the two driving axles under normal operating conditions. Provision is made to "lock out" this differential unit under adverse conditions when the differential action would cause a loss of traction. Such interaxle differential units can include a transmission unit at the input thereto to provide one or more additional gear ratios at the input to the drive axles.

Heretofore, it was the normal practice to fabricate the output shaft of the transmission unit, which also serves as the input to the power divider, and its associated output gear and clutch member as a one-piece structure. While this has proved to be an acceptable design from the standpoint of machining accuracy and alignment, it has excused certain overriding maintenance problems. Specifically, the clutch member and gear member wear at different rates, and it is often necessary to replace the entire unit at a time when only one section of it is worn or damaged. For example, the shaft, in itself, can be expected to have substantially unlimited life, while the gear is subjected to more severe load conditions, and the clutch, by virtue of its periodic engagement and disengagement, can be expected to wear at a much faster rate.

In addition to the element of material waste, perhaps the most vexing problem associated with this type of construction is that it is extremely difficult to remove such a combination unit. While the transmission is fairly accessible, owing to its location ahead of the front drive axle, the output shaft carries a plurality of components of both the interaxle differential and transmission, and cannot be removed without removing and disassembling the entire power divider and transmission assembly.

Where an auxiliary transmission of this type is to be used for a single axle, it has been found to be convenient to use the same housing as that used for a tandem, simply eliminating the interaxle differential and replacing one of the side gears with a transfer gear fixed to the transmission output shaft to transfer power to the pinion shaft. This reduces the number of different critical parts which must be made available for a series of axles.

Although there are not as many parts involved in the disassembly of a transmission associated with a single axle, the problem of nonuniform wear is the same as with a tandem.

Accordingly, it is an object of the present invention to provide a geared drive mechanism which is easily maintainable.

Another object of the invention is to provide a geared drive mechanism in which the components subject to rapid wear are easily replaceable without necessitating replacement of related components which remain in good operating condition.

Another object of the invention is to provide an axle-mounted auxiliary transmission in which the gears and clutch members thereof can be removed and replaced without removing the transmission from the vehicle in which it is installed.

Another object of the invention is to provide such a transmission in which the output gear and its associated clutch member are separate components.

To accomplish these objectives the present invention provides a shaft for a geared drive mechanism which incorporates a clutch member and a gear accurately located on the shaft by means of splines and restrained from relative axial movement thereon. As applied to an auxiliary transmission for a drive axle the invention provides a combination transmission output shaft and power divider or transfer case input shaft in the form of a subassembly incorporating a clutch output member and transmission output gear easily accessible from outside the transmission.

Other objects and advantages of the invention will be apparent from the following description when taken in connection with the accompanying drawings, wherein:

FIG. 4 is a sectional elevation view of an auxiliary transmission assembly incorporating the invention as applied to a single axle.

Figure 1:
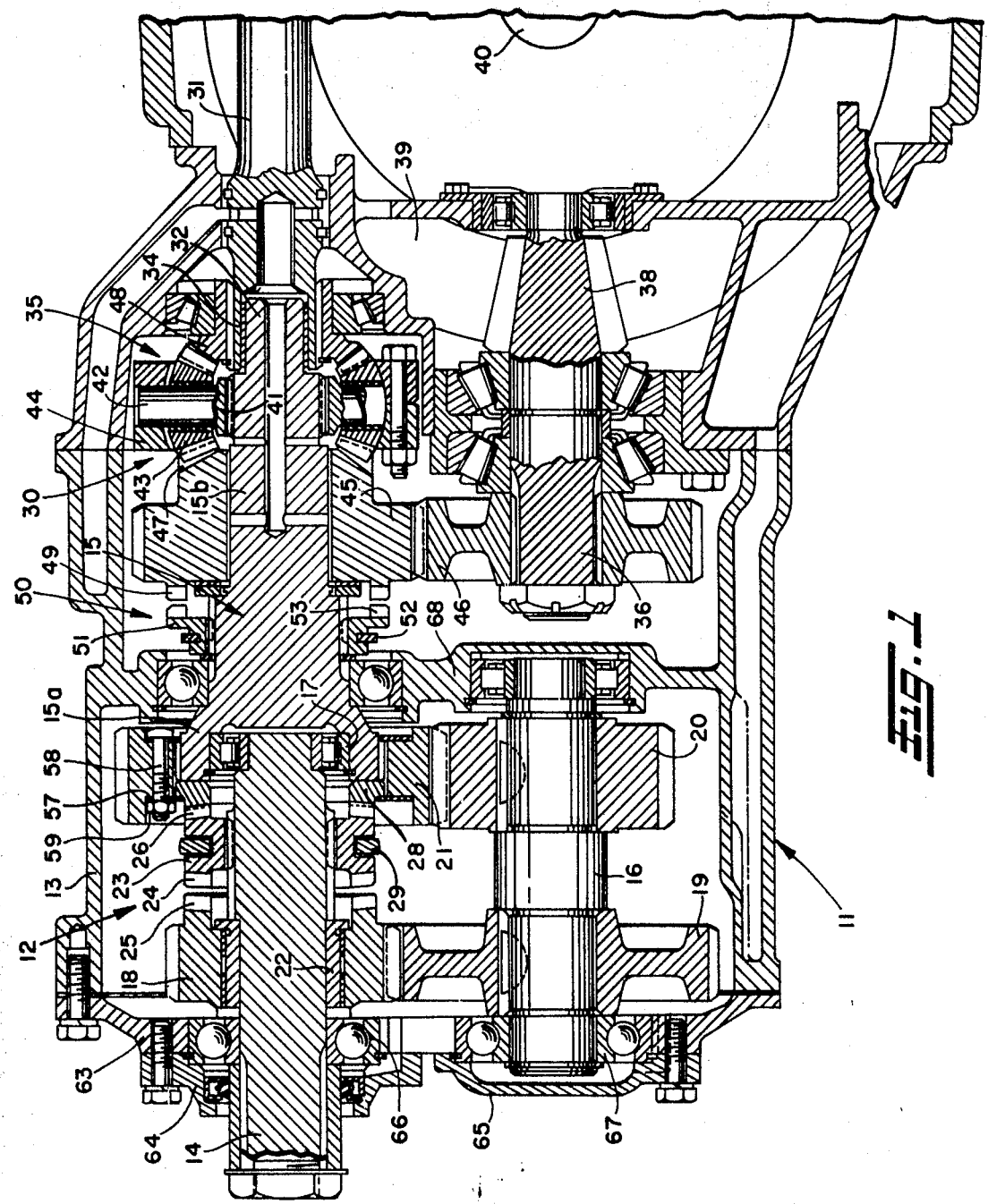
FIG. 1 is a sectional elevation view of an auxiliary transmission assembly incorporating the invention as applied to a tandem axle.

Referring to the drawings, FIG. 1 illustrates a geared drive mechanism 11 which, for purposes of illustration, comprises an interaxle differential structure which functions as a power divider for driving a tandem axle combination. Such as interaxle differential structure and its relationship to tandem axles is illustrated and described in detail in U.S. Pat. No. 3,146,842. Power is transmitted to the power divider through a transmission, designated generally by the numeral 12, which gives multispeed capability to the drive axle.

The transmission 12 includes a housing 13 which encloses and supports an input shaft 14, a shaft 15 which includes both a transmission output section 15a and a power divider input section 15b and a countershaft 16. The shaft 15 is coaxial with the input shaft 14 and is supported thereon by means of a bearing 17.

Power is transmitted through an input gear 18 mounted on the input shaft for selective engagement therewith, a first intermediate gear 19 fixed to the countershaft 16 and meshed with the input gear, to a second intermediate gear 20, also fixed to the countershaft, and then to an output gear 21 which is meshed with the second intermediate gear and fixed to the output shaft section 15a.

The input gear 18 is mounted for rotation relative to the input shaft on a spacer 22 press fit to the shaft. A toothed clutch driving member 23 is splined to the input shaft 14 between the input and output gears and includes a first axial tooth section 24 engageable with a complemental tooth section 25 formed on the input gear 18 and a second axial tooth section 26 engageable with a complemental tooth section 27 (FIG. 2) on a clutch driven member 28, rotatable with the output gear. A selector fork 29, operable from outside the transmission, engages the clutch driving member 23 between the tooth sections and slides it along the splined input shaft to select a desired gear ratio. When the clutch member 23 is moved to the left as shown in FIG. 1, power is transmitted from the input shaft through the clutch to the input gear, then through the intermediate gears on the countershaft to the output gear 21 and shaft 15. While this system is flexible with regard to the gear ratio it can provide, it is common for such systems to provide a 2:1 reduction. reduction When the clutch member 23 is moved to the right, power is transmitted from the input shaft 14 directly to the output shaft section 15a through the clutch driven member 28.

As stated above, the shaft 15 includes an input shaft section 15b to the power divider unit, designated generally by the numeral 30, also partially enclosed within the housing 13. The input shaft section 15b is coaxial with an output shaft 31 and includes a pilot portion 32 which is received within a pilot opening formed in the end of the output shaft, a suitable bushing 34 being provided therebetween. The input shaft section 15b and output shaft 31 are connected together through a differential unit 35.

A second output shaft 36, driven off the first through a clutch and gear train, is provided with a bevel drive pinion 38, fixed thereto and meshing with an angle drive, or ring gear 39. The ring gear 39 is drivingly connected to an axle 40 by means of a conventional differential unit (not shown). In a similar manner, the first output shaft 31 is drivingly connected to the second axle of the tandem combination, also by means of a conventional differential unit.

The interaxle differential unit 35 is a spider 41 splined to the input shaft section 15b and includes a plurality of pins 42 which extend radially outwardly from the center of the spider and support bevel differential gears 43. An annular differential carrier or housing 44 surrounds the spider 41 and the differential gears 34, and supports the outer ends of the pins 42.

The gear train driving the second output shaft 36 comprises a combination drive gear 45, mounted on the input shaft section 15b for relative rotation thereto, which includes a first section meshing with a driven gear 46 fixed to the second output shaft, and a bevel section 47 meshing with the differential gears 43. The differential gears are also meshed with another bevel gear 48 splined to the output shaft 31, the gears 45 and 48 corresponding in function to the side gears found in conventional axle differential units.

The drive gear 45 has a third set of teeth 49 on the front face thereof which serve as the driven member of a lockout clutch 50. The driving member 51 of the clutch is splined to the shaft 15 and includes an actuating yoke 52, operable in a conventional manner by means of a power cylinder or the like.

When the teeth 53 of the driving member 51 and teeth 49 of the driven member are disengaged, power is transmitted through the spider 41 to the differential unit 35 to permit a differential relationship to exist between the two output shafts 31 and 36. However, when the clutch is engaged, the gear 45 is locked to the shaft 15 to provide a direct drive to both output shafts, through the spider 41 in the case of output shaft 31, and through gears 45 and 46 in the case of the second output shaft 36.

Lubrication can be accomplished by means of a splash system, depending upon the gears at the bottom end of the housing 13 to distribute lubricant to the remaining components.

Figure 2:
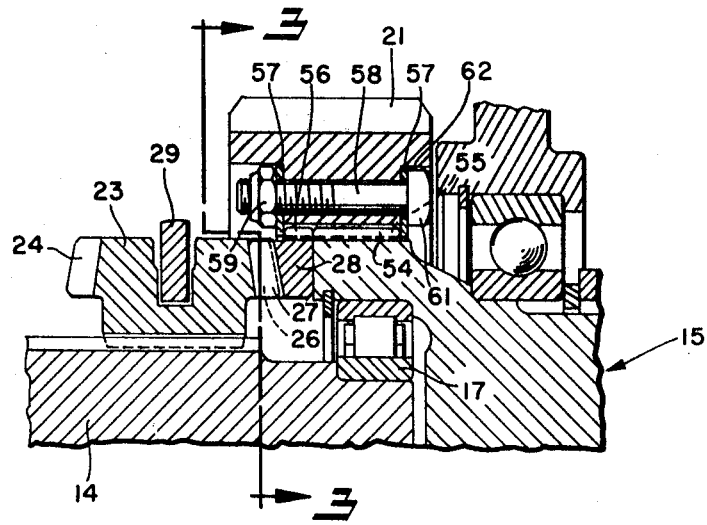
FIG. 2 is a partial, enlarged sectional view of the three-piece subassembly of the invention.
Figure 3:
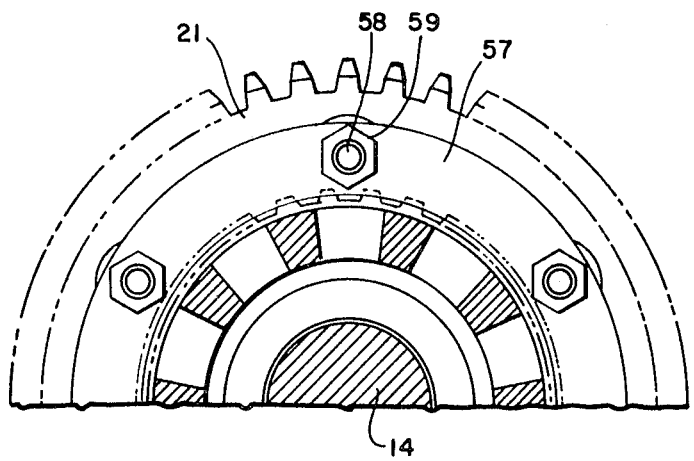
FIG. 3 is a sectional view taken along line 3—3 of FIG. 2.

Referring to FIGS. 2 and 3, according to the present invention, the output shaft section 15a of the transmission 12, the output gear 21, and the clutch driven member 28 form a three-piece subassembly. The forward end of the shaft section 15a which carries the bearing 17 supporting the input shaft 14 has an enlarged externally splined section 54 adapted to receive a complemental, internally splined section 55 of the output gear 21. The splined section of the gear is somewhat wider than the splined section of the shaft and also receives a complemental, externally splined section 56 of the clutch driven member 38, which fits flat against the front face of the shaft.

To retain the three pieces as a unit, the splined sections of the clutch member 28 and the output shaft section 15a are clamped between annular retaining members 57 bolted to the gear 21 by means of a plurality of bolts 58 and associated nuts 59 equally spaced about the web section of the gear. To prevent rotation of the bolts, the web of the gear is recessed and the head 61 of the bolt is disposed close to edge 62 of the recessed area.

To provide access to the gear 21 and clutch member 28, as well as to other components of the transmission, the front of the housing 13 is closed by a bolted-on cover plate 63. Individual cover plates 64 and 65 provide access to a front input shaft bearing 66 and a front countershaft bearing 67, respectively. Once the cover plate 63, the gears 18 and 19, and the clutch driving member 23 are removed, the nuts 59 are easily accessible to effect removal of the clutch driven member 28 and the gear 21. Because of the proximity of the gear 21 to the partition wall 68 between the transmission and power divider unit there is no danger of the bolts 58 falling into the transmission, or of the rear retaining member 57 falling out of place.

Referring to FIG. 4, the transmission 12 is illustrated as it is applied to a single axle. It can be seen that the transmission 12, the housing 13, and the output gears 46 and 38 to the axle 40 are identical to those shown in FIG. 1 for the tandem axle. In this embodiment, however, the power divider 35 is deleted and the shafts 15 and 20 are replaced by a single shaft 151 to which the transmission output gear is fixed as before. To transfer power from the transmission output to the output shaft 36, a transfer gear 145, meshing with the output gear 46, is splined or other wise fastened to the shaft 151. The output gear 21, and the clutch driven member 28 are mounted on the shaft 151 to form a three-piece subassembly similar to that described for the tandem axle application.

Because of the accessibility afforded by the above construction, periodic replacement of the clutch members and gears in the transmission can be carried out as necessary without removing the entire power divider and transmission from the vehicle.

I now claim:

1. In a geared drive mechanism comprising:

a housing; and a transmission unit within said housing, said transmission unit comprising an input shaft, an input gear rotatably supported on said shaft, an output shaft aligned with said input shaft and supported thereon, an output gear fixed to said output shaft, a countershaft disposed parallel to said input and output shafts, first and second intermediate gears fixed to said countershaft and meshing with said input and output gears respectively, clutch driven members fixed to adjacent faces of said input and output gears, and a sliding clutch driving member carried by said input shaft between said input and output gears and selectively engageable with said clutch driven members;

the improvement consisting in that said output shaft, output gear and clutch driven member associated with said output gear comprise a three-piece subassembly fastened together in a manner permitting disassembly thereof while said output shaft remains supported within said housing.

2. A geared drive mechanism as claimed in claim 1, in which said subassembly comprises an elongated output shaft having an enlarged diameter externally splined portion formed adjacent one end thereof, a clutch member having a mounting portion disposed in face-to-face contact with said one end of said shaft and splined splined portion alignable with the spline on said shaft, a gear having an internally splined section engageable with the splined portions of both said shaft and said clutch member, and means for fastening said shaft, clutch member and gear together to form an integral unit.

3. A geared drive mechanism as claimed in claim 2, in which said fastening means comprises a pair of annular retaining members attached to opposite faces of said gear by a plurality of bolts and nuts and in clamping engagement with said clutch member and shaft.

4. A geared drive mechanism as claimed in claim 3, in which the heads of the bolts retaining said annular member are received in close-fitting recesses formed in a face of said gear to prevent rotation thereof.

5. A geared drive mechanism as claimed in claim 3, in which said housing includes a cover plate in which one end of said input and intermediate shafts are supported, removal of said cover plate providing access to said plurality of nuts for removal of said clutch member and said gear from said output shaft.

6. A geared drive mechanism as claimed in claim 1, in which said housing comprises a substantially cylindrical cast member having one end open for attachment to an axle differential unit, and the other end closed by a cover member, said cover member supporting said input and countershafts and providing access to said output gear and associated clutch driven member for removal thereof from said output shaft.

7. A power divider assembly adapted to be operatively attached to an axle differential unit comprising, in combination:

a housing;

a partition wall separating said housing into two sections;

an interaxle differential unit located within one section of said housing adjacent and operatively connected to said axle differential;

a transmission unit located within the other section of said housing, said transmission comprising:

an input shaft, an output shaft extending through said partition wall to serve as an input shaft for said interaxle differential, an input gear supported on said input shaft for rotation relative thereto, an output gear fixed to said output shaft, clutch driven members operatively associated with said input and output gears, intermediate gears supported for engagement with said input and output gears for the transmission of power therethrough, and a clutch driving member mounted for rotation with said input shaft and slideable into engagement with said clutch driven members to either lock said input gear to the input shaft or lock the input and output shafts together;

characterized in that said output shaft, output gear, and associated clutch driven member comprises a three-piece subassembly capable of being disassembled from outside the housing.

8. A power divider assembly as claimed in claim 7, in which said subassembly comprises:

means for joining said clutch driven member to said output gear for rotation therewith, means for joining said output gear with said output shaft for rotation therewith, and means associated with said gear for clamping said output shaft and clutch driven member together.

9. A power divider assembly as claimed in claim 8, in which said gear and clutch are joined by means of an internal spline formed on said gear and a complemental, external spline formed on said clutch, said internal spline being further engageable with a complemental, external spline formed on said clutch, said internal spline being further engageable with a complemental, external spline formed on said output shaft.

10. A power divider assembly as claimed in claim 8, in which said clamping means comprises a pair of annular retaining members bolted to opposite faces of said gear and engageable with the splined portions of said output shaft and clutch member to clamp them together.

11. In a geared drive mechanism, a shaft assembly comprising:

an elongated shaft member having an enlarged diameter externally splined section formed thereon, a clutch member in face to face contact with a portion of said shaft member and having an externally splined section alignable with the splined section of said shaft, a gear having an internally splined section engageable with the splined sections of both said shaft member and said clutch member, and means for restraining relative axial movement of said shaft member, said clutch member and said gear.

12. A shaft assembly as defined in claim 11, in which said means for restraining axial movement comprises a pair of annular retaining members attached to opposite faces of said gear and in clamping engagement with said shaft member and clutch member.

13. A shaft assembly as defined in claim 11, in which said means for restraining axial movement comprises a pair of annular retaining members attached by a plurality of through bolts to opposite faces of said gear and engageable with the splined sections of said clutch member and said shaft member.